United States Patent [19]
Derleth et al.

[11] Patent Number: 5,232,883
[45] Date of Patent: Aug. 3, 1993

[54] PROCESS FOR OBTAINING MONODISPERSE MICROSPHEROIDAL PARTICLES, MICROSPHEROIDAL SILICA PARTICLES OF HIGH SPECIFIC SURFACE, AND CATALYSTS SUPPORTED ON THESE PARTICLES

[75] Inventors: Helmut Derleth, Nienburg, Fed. Rep. of Germany; Abel Grosjean, Brussels, Belgium

[73] Assignee: Solvay (Société Anonyme), Brussels, Belgium

[21] Appl. No.: 848,347

[22] Filed: Mar. 9, 1992

[30] Foreign Application Priority Data

Mar. 11, 1991 [BE] Belgium .............................. 09100227

[51] Int. Cl.$^5$ ...................... B01J 37/34; B01J 21/06
[52] U.S. Cl. ............................................ 502/5; 502/8; 502/9; 502/242; 502/256
[58] Field of Search ............... 502/5, 8, 9, 234, 236, 502/242, 256

[56] References Cited

U.S. PATENT DOCUMENTS

| | | | |
|---|---|---|---|
| 2,484,284 | 10/1949 | Glassbrook et al. | 502/5 |
| 2,759,877 | 8/1956 | Eron | 502/5 |
| 2,825,721 | 3/1958 | Hogan et al. | 260/88.1 |
| 2,968,652 | 1/1961 | Mertes | 502/5 |
| 3,105,024 | 9/1963 | Schutze et al. | 502/5 |
| 3,622,521 | 11/1971 | Hogan et al. | 252/430 |
| 3,872,217 | 3/1975 | Merz et al. | 423/338 |
| 3,887,494 | 6/1979 | Dietz | 252/452 |
| 4,010,242 | 3/1977 | Iler et al. | 423/335 |
| 4,037,042 | 7/1977 | Mueller-Tamm et al. | 526/106 |

FOREIGN PATENT DOCUMENTS

| | | |
|---|---|---|
| 0167690 | 1/1986 | European Pat. Off. . |
| 0170334 | 2/1986 | European Pat. Off. . |
| 0197776 | 10/1986 | European Pat. Off. . |
| 2610852 | 10/1976 | Fed. Rep. of Germany . |
| 2290395 | 6/1976 | France . |
| 1077908 | 8/1967 | United Kingdom . |
| 1094798 | 12/1967 | United Kingdom . |
| 1550951 | 8/1979 | United Kingdom . |

*Primary Examiner*—Carl F. Dees
*Attorney, Agent, or Firm*—Spencer, Frank & Schneider

[57] ABSTRACT

Process for obtaining monodisperse microspheroidal particles, comprising spraying an electrostatically charged gellable liquid material through a spraying orifice and into a chamber, so as to produce macrodrops which break up into microdrops which fall in the chamber and within which gelling is produced after spraying. The microspheroidal particles thus obtained can be collected on a solid surface or preferably in a liquid medium and find application in the manufacture of silica-based microspheroidal particles. These microspheroidal particles can be employed as catalyst supports for alpha-olefin polymerization.

17 Claims, 2 Drawing Sheets

PROCESS FOR OBTAINING MONODISPERSE MICROSPHEROIDAL PARTICLES, MICROSPHEROIDAL SILICA PARTICLES OF HIGH SPECIFIC SURFACE, AND CATALYSTS SUPPORTED ON THESE PARTICLES

BACKGROUND OF THE INVENTION

1. Field of the Invention

The present invention relates to a process for obtaining microspheroidal particles, more particularly silica-based microspheroidal particles. It also relates to microspheroidal silica particles of high specific surface. It relates further to catalysts containing chromium supported on these microspheroidal silica particles and to a process for polymerising alpha-olefins in the presence of these catalysts.

2. Description of the Related Art

Supported catalysts which can be employed for the polymerisation of alpha-olefins have been described in U.S. Pat. No. 2,825,721 (Phillips Petroleum) and are known under the name of catalysts of the Phillips type.

The catalysts described in this patent contain a chromium oxide dispersed on a support which may be silica and are activated by calcination in an oxidising atmosphere under conditions such that at least a proportion of the chromium is converted into hexavalent chromium.

Supported catalysts of this type have also been described which are capable of producing polymers exhibiting less high average molecular weight (that is to say characterised by higher melt indexes), which are more easily convertible by conventional processing methods. This modification is obtained by incorporating titanium oxide in the catalyst, besides chromium oxide. This incorporation may be carried out subsequently to that of chromium, by dispersing onto the support, via a non-aqueous medium, a titanium compound capable of being converted into oxide by calcination (U.S. Pat. No. 3,622,521 (Phillips Petroleum)). This incorporation can also be carried out by coprecipitating the titanium compound and the silica. The chromium compound can also be incorporated in this way (U.S. Pat. No. 3,887,494 (Phillips Petroleum)). The gels resulting from these coprecipitations are known, depending on their composition, under the name of silica-titanium "cogels", silica-chromium "cogels" and silica-titanium-chromium "tergels".

It is well known, furthermore, that the texture of these catalysts exerts a considerable influence on the morphology of the polymers obtained with their use. Because of this it has already been proposed to disperse chromium on so-called "microspheroidal" silicas. These are silicas whose particles, generally of spherical shape and of narrow particle size distribution, have a mean diameter or approximately between 0.5 and 200 microns.

Many methods for manufacturing these "microspheroidal" silicas have been described in the literature. Examples of these methods which may be mentioned are vaporisation, agglomeration and emulsion polymerisation.

In vaporisation techniques a solution of sodium silicate, optionally partially neutralised, is dried by evaporation at high temperature (Patents GB-A-1,077,908 and GA-A-1,094,798 (Grace & Co.)). The xerogel particles thus obtained are too fine in particle size for use as a catalyst support for alpha-olefin polymerisation.

The preparation of spheroidal silica particles which can be employed as catalyst supports for alpha-olefin polymerisation by spraying a hydrosol obtained by introducing a solution of an alkali metal silicate lengthwise and tangentially into a stream of aqueous inorganic acid has also been described (Patent Applications DE-A-2,540,279 and DE-A-2,540,278 (BASF)). The addition of the alkali metal silicate solution can also be performed at various points distributed along the stream of dilute inorganic acid (Patent Application DE-A-2,103,243 (BASF)). The hydrosol thus obtained is unstable and exhibits a lack of homogeneity due to changes in viscosity and in gelling time as a function of time and location. The production of silica microparticles by this process cannot therefore be uniform and/or reproducible with time.

Spheroidal silica particles can also be obtained by agglomeration of colloidal silica in a polymeric matrix of urea and formaldehyde (U.S. Pat. No. 4,010,242 (DuPont de Nemours)). Since the catalyst particles obtained by starting with these supports are brittle, they quickly break up during the polymerisation, to the detriment of the morphology of the polymers obtained with their use.

When emulsion polymerisation is used, a suspension of droplets of acidic sodium silicate solution is gelled in a viscous liquid in which neither the silicate solution nor the product of gelling are soluble (see, for example, Patent Application EP-A-170,334 (Shell Int. Res. Mij.)). This process makes it possible to obtain spheroidal particles of large size which must be treated mechanically to permit their use as catalyst supports for alpha-olefin polymerisation. This mechanical treatment takes place to the detriment of the morphology of the supports.

The present invention aims to provide a process for obtaining microspheroidal particles of good morphology, not exhibiting the disadvantages of the known processes.

SUMMARY OF THE INVENTION

The invention consequently relates, mainly, to a process for obtaining monodisperse microspheroidal particles, characterised in that it comprises spraying an electrostatically charged gellable liquid material (L) through a spraying orifice and into a chamber, so as to produce macrodrops which break up into microdrops which fall in the chamber and within which gelling is produced. The microspheroidal particles thus obtained can be collected on a solid surface or preferably in a liquid medium (C).

"Microspheroidal particles" is intended to mean particles of overall spherical shape, from 50 to 200 $\mu$m in diameter and preferably with a diameter of more than 100 $\mu$m, additionally characterised by a specific surface greater than 200 m$^2$/g.

The microspheroidal particles obtained by the process of the invention are generally monodisperse. "Monodisperse" means particles which have a narrow particle size distribution characterised by the standard deviation of the mean value of their diameter.

Within the meaning of the present invention the term "macrodrops" is intended to define drops from 100 to 1000 $\mu$m in diameter, originating directly from the spraying orifice. These macrodrops of overall spherical shape and whose dimensions are determined especially by those of the spraying orifice, break up, under the effect of electrostatic forces, into smaller drops called "microdrops". These microdrops, also of overall spherical shape, have a diameter varying from 50 to 200 μm and preferably of more than 100 μm.

The terms "spraying orifice" which are employed in the present description are intended to define both a single orifice and a plurality of orifices. These orifices may be stationary orifices such as tuyeres, injectors, dies or hollow needles, or movable orifices such as rotary sprayers.

The size of these orifices is generally between 50 and 500 μm.

The microdrops obtained in the process according to the invention are gelled so as to generate microspheroidal particles of general dimensions similar to those of the said microdrops.

Examples of particles originating from a gelling operation according to the process of the invention are particles of oxides of metals of groups IIIb, IVb, IIIa and IVa of the Periodic Table (version published in the Handbook of Chemistry and Physics, 50th edition, page B-3, 1969-1970), such as titanium, zirconium, aluminium and silicon, silicon being particularly preferred.

The process according to the invention comprises spraying an electrostatically charged gellable liquid material (L) through a spraying orifice and into a chamber. The liquid material (L) is charged electrostatically by means of one or more electrode(s) charged either positively or negatively and arranged directly in the liquid material (L) or on the outer face of the spraying orifice when the latter consists of an electrically conductive material. In most cases the electrostatic charge is produced by a traditional generator such as a belt generator of the van de Graaf electrostatic generator type or by a high-voltage rectifier. The electrostatic voltage to which the liquid material (L) is subjected is generally between 1 and 100 kV, preferably between 5 and 80 kV, more particularly between 10 and 50 kV. The macrodrops obtained during the spraying are destabilised by the density of electrostatic charges and break up into finer drops (microdrops) which have a higher surface/volume ratio. (It is generally accepted that the higher the voltage applied to the liquid material, the finer the microdrops.)

It is obvious that the liquid material (L) is sprayed into the chamber at a pressure higher than that prevailing therein.

The liquid material (L) of the process according to the invention may be any liquid capable of being gelled. Solutions or suspensions containing a compound chosen from precursors of the oxides of abovementioned metals constitute examples of such materials. Particular examples of these compounds are silicon derivatives capable of gelling under the action of a liquid or gaseous acidic or basic compound, called compound (B) hereinafter. The gellable compound is generally chosen from alkali metal, ammonium and quaternary ammonium silicates or tetraalkoxysilanes such as tetramethoxy- and tetraethoxysilane.

Examples of acidic compounds which can be employed as compounds (B) are
inorganic oxyacids such as sulphuric acid or carbon dioxide;
inorganic hydracids such as hydrogen chloride;
carboxylic acids such as acetic acid.

Examples of basic compound (B) are ammonia and aliphatic, alicyclic or aromatic amines.

In the process according to the invention the contact of the compound (B) with the liquid material (L) may be brought about before, during or after the latter is sprayed. Three alternative forms (alternative forms (x), (y) and (z)) are generally distinguished, according to the composition of the liquid material (L) and the time when (B) is brought into contact with it.

BRIEF DESCRIPTION OF THE DRAWINGS

These alternative forms are detailed in the description which is to follow, in which reference is made to the attached FIGS. 1 to 3 which illustrate diagrammatically the devices employed for implementing them.

The following are shown in these figures:
the chamber—1
the electrostatic charge generator—2
the electrode(s)—3
the spraying orifice—4
a vessel containing the liquid material (L)—5
a vessel containing the compound (B)—6. In the alternative form of embodiment illustrated by FIG. 1, this vessel is the chamber 1 itself
a liquid (C) intended to collect the microparticles—7
an orifice for removing the liquid (C)—8
a mixer die (FIG. 3)—9

In these devices the various components capable of being electrostatically charged are generally electrically insulated.

Figure 1:
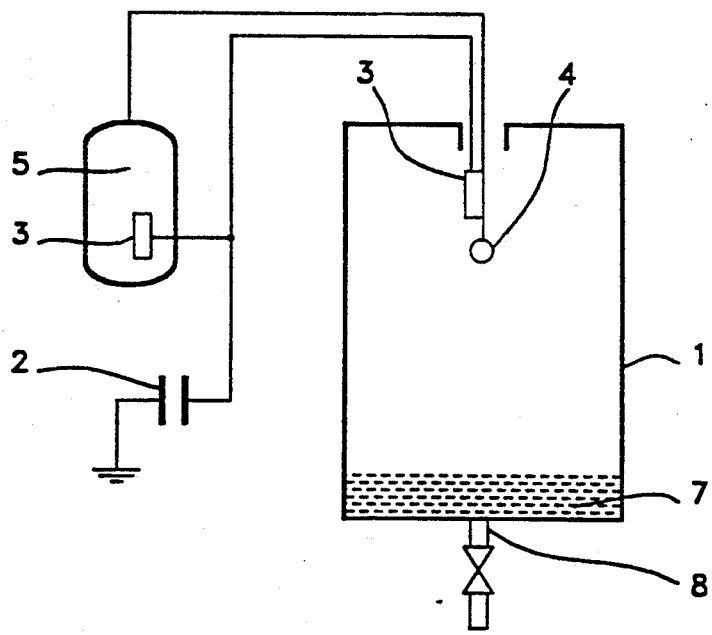

In the first alternative form (alternative form (x) illustrated by FIG. 1) the liquid material (L) is sprayed into the chamber 1 containing the compound (B) in the gaseous state. A material (L) which is particularly preferred in this case is a solution of sodium silicate. The silicon content in the liquid material (L), calculated in % by weight of $SiO_2$, is between 1 and 30%, preferably between 2 and 20%, more particularly between 5 and 15% by weight of $SiO_2$ relative to the weight of the liquid material (L). Hydrogen chloride or ammonia is preferably employed as compound (B). Since the pressure prevailing in the chamber is generally equal to atmospheric pressure, the partial pressure of the compound (B) in this chamber is generally lower than one atmosphere and this constituent is generally mixed with a neutral gas such as dry air or nitrogen.

Figure 2:
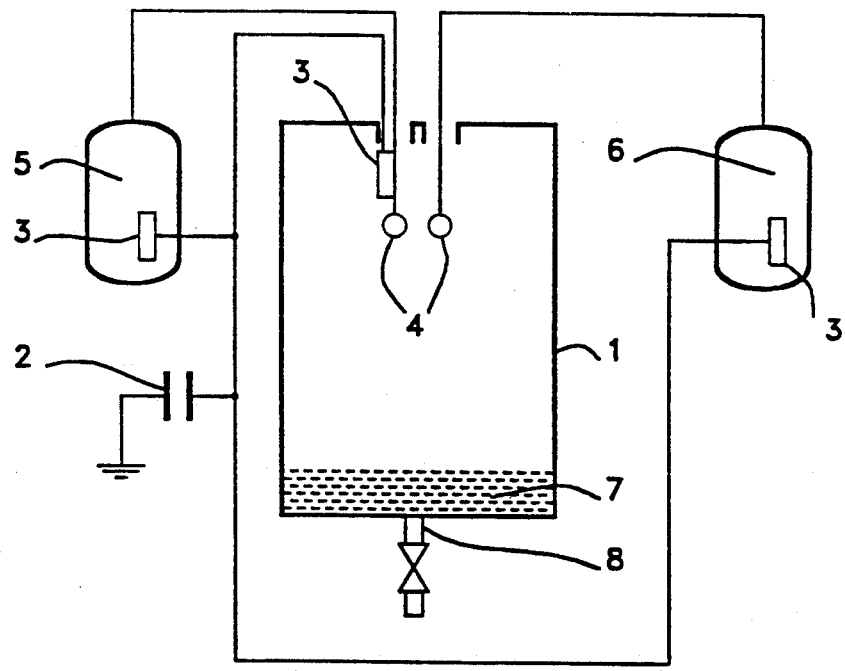

In the second alternative form of the process according to the invention (alternative form (y) illustrated by FIG. 2), the liquid material (L) and the compound (B) in liquid form or in the form of a generally aqueous solution are sprayed into the chamber 1 independently of each other but simultaneously. The two spraying orifices 4 are in most cases situated so that the drops which issue therefrom can come into contact with each other so that the compound (B) can induce the gelling of the liquid material (L) which, here too, is preferably sodium silicate. The preferred compound (B) is sulphuric acid for reasons of corrosiveness. The concentration of compound (B) in the solution is generally between 1 and 50% by weight, preferably between 2 and 20%, more particularly between 5 and 10% by weight of compound (B) relative to the total weight of the solution. This compound (B) may also be electrostatically charged with a charge of the same polarity as that of the liquid material (L). The nature of the atmosphere prevailing in the chamber is in most cases chosen from neutral gases such as dry air or nitrogen.

In order to improve the contact between the liquid material (L) and the solution containing the compound (B), the region of contact of the drops may be surrounded by an annular acoustic wave generator arranged so as to make the vibration nodes and antinodes coincide with the trajectory of the drops.

Figure 3:
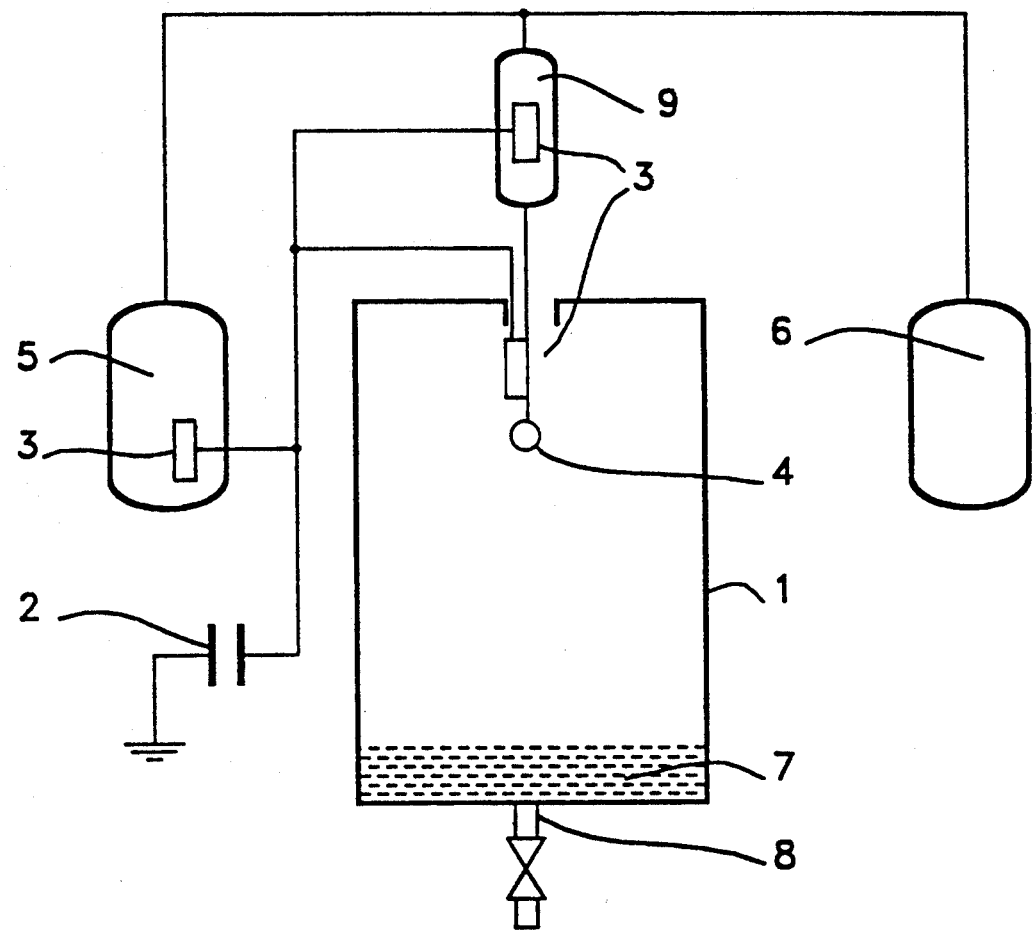

In the third alternative form of the process according to the invention (alternative form (z) illustrated by FIG. 3), the liquid material (L) is brought into contact with a generally aqueous solution of the compound (B) in a mixer die 9 situated in front of the spraying orifice 4. In this alternative form of the process according to the invention the nature of the liquid material (L) is preferably identical with those described above in the case of alternative forms (x) and (y) and the nature of the compound (B) is the same as that described in the case of the alternative form (y). The pH of the liquid material (L) to which the solution of the compound (B) has been added is generally between 3 and 9. The nature of the gaseous atmosphere prevailing in the chamber 1 is in most cases chosen from neutral gases such as dry air or nitrogen. The gelling process can also be accelerated by introducing into the chamber 1 a compound (B) in the gaseous state, which is identical with or different from the above compound (B).

The alternative form (x) gives very good results.

The temperature at which the liquid material (L) is sprayed is between 0° and 100° C., preferably between 10° and 50° C. Good results are obtained when this spraying is performed at room temperature.

In the remainder of the description of the invention the liquid material (L) will for simplicity be assumed to be similar to a silica hydrosol, without, however, thereby limiting the scope of the invention.

Whatever the alternative form employed, the spraying orifice 4 is situated in the upper part of the chamber 1, so that the gelling microdrops travel a certain distance in a gaseous atmosphere before being collected on a solid surface or preferably in a liquid medium (C) 7. When the chamber 1 contains a compound (B) in the gaseous state, the liquid (C) is generally an aqueous solution of ammonium sulphate, hydrochloric acid or aqueous ammonia. In other cases the liquid (C) is chosen from inert liquids such as water. Organic liquids can also be employed as liquid (C). Examples of such liquids are aliphatic, cycloaliphatic and aromatic hydrocarbons which are liquid at room temperature.

Gelling of the silica takes place predominantly during the fall of the microdrops in the chamber. The duration of this fall depends on the density of the liquid material (L), on the size of the microdrops and on the height of the chamber. Some routine tests may be needed to take these factors into account. It is obvious that the height of the chamber must be sufficient to ensure the gelling process during the fall of the microdrops and that its diameter must be such that their deposition on the side walls is prevented. The height of the chamber is generally between 1 and 20 m, preferably between 4 and 15 m, more particularly between 5 and 10 m. Its diameter is between 0.2 and 6 m, preferably between 0.5 and 4 m, more particularly between 1 and 3 m. The diameter of the chamber can be increased in the case of spraying through a plurality of orifices.

The liquid material (L) employed in the process according to the invention may also contain titanium and/or chromium compounds capable of coprecipitating with the silica.

The titanium compounds are generally compounds which can be converted into metal oxides by calcination, such as titanium tetrachloride, titanium sulphate, titanium oxalate and titanium potassium oxalate. When the titanium compound is incorporated in the solution of alkali metal silicate, the preferred titanium compounds are water-soluble substances which do not precipitate the silicate, such as titanium oxalate and titanium potassium oxalate. The titanium content in the liquid material (L) in % by weight relative to the weight of $SiO_2$ varies from 0.1 to 10%, preferably from 0.5 to 7.5%, more particularly from 1 to 4% by weight of titanium relative to the weight of $SiO_2$ present in the liquid material (L).

The liquid material (L) may also contain a chromium compound. Suitable chromium compounds are, for example, chromic sulphate, chromium acetate, chromium chloride or nitrate and chromium oxides. The chromium is present in the starting material in proportions varying from 0.05 to 10% by weight of chromium, calculated relative to the weight of $SiO_2$, preferably from 0.1 to 5%, more particularly from 0.25 to 2% by weight of chromium relative to the weight of $SiO_2$.

The titanium compound can also be incorporated into the spheroidal microparticles—and this constitutes another aspect of the invention—by introducing $TiCl_4$ vapour into the chamber. Adsorption of $TiCl_4$ on the microdrops of the gelling hydrosol is then observed. The quantity of $TiCl_4$ to be used must result in an incorporation of titanium in the solid particles which is equivalent to that described above. The determination of this quantity may consequently require some preliminary routine tests.

The incorporation of fine particles of metal oxides and salts such as titanium, aluminium, silicon or zirconium oxides into the liquid material (L) is also possible.

Not later than after substantial gelling, as described above, the microspheroidal particles are collected on a solid surface or preferably in the liquid (C) and then removed in a conventional manner via an orifice which generally ends in a valve. When the microspherical particles are collected in the liquid (C) they are separated from the suspension thus formed by known physical methods such as, for example, filtration or decanting.

The particles thus obtained can, if need be, be subsequently washed a number of times with water and then with a washing agent chosen from aqueous solutions of ammonium salts and dilute acids so as to reduce the alkali metal content of these particles to concentrations of less than 1% by weight, preferably less than 1 g/kg, in particular less than 0.4 g/kg.

These microspheroidal particles are then brought into contact with an organic liquid of the series of alkanols containing from 1 to 4 carbon atoms and/or alkanones containing from 3 to 5 carbon atoms. This treatment is intended to extract water from them.

The suspension thus obtained, dehydrated by the organic liquid, is finally dried by any one of the methods which are known for this purpose, for example by a heat treatment in an agitated or fluid bed or by spraying in conditions such that liquid evaporation occurs (obtaining a xerogel).

Drying by azeotropic distillation can also be performed. The microspheroidal particles obtained according to the invention are generally microspheres from 50 to 200 μm in diameter and preferably with a diameter of more than 100 μm, whose specific surface is greater than 200 m²/g. The pore volume of these microspheroidal particles is generally between 1 and 3.5 cm³/g, preferably between 1.2 and 2.5 cm³/g, more particularly between 1.4 and 2.2 cm³/g.

An advantage of the process according to the invention is the morphology and the particle size distribution of the particles which it allows to be obtained. These two properties can be characterised by observation with an optical microscope and more precisely by treating the result of this observation using image analysis. When this method is used it is seen that the particles obtained by the process of the invention are microspheres whose image has a roundness factor, defined as being the ratio of the square of the mean perimeter of the particles to the mean surface area of the latter multiplied by $4\pi$, which is lower than 1.40, preferably lower than 1.35, more particularly lower than 1.30. Another advantage of this invention lies in the fact that the particle size distribution of the microspheroidal particles is particularly narrow. It can be characterised by using a variation coefficient, expressed in %. An excessively high value of this variation coefficient indicates the existence of a large quantity of abnormally fine or coarse particles. The variation coefficient of the particle size distribution is lower than 75%, preferably lower than 70%, more particularly lower than 60%.

The morphological characteristics of the powders obtained can be easily modified in the process according to the invention by varying the viscosity and/or the electrostatic voltage of the liquid material (L).

The charged drops can also be diverted by fitting electrodes of the same polarity at certain points of the chamber. The fitting of electrodes of opposite polarity, on the other hand, allows the drops to be attracted towards these points. These modifications also enable the morphology of the microspheroidal particles to be controlled.

The process according to the invention also makes it possible to quickly modify the chemical composition of the solid particles merely by modifying the composition of the liquid material (L).

Some of the silica-based microspheroidal particles obtained by virtue of the process of the invention exhibit a combination of properties that the particles belonging to the prior art do not possess. These particles, from 50 to 200 $\mu$m in diameter and preferably with a diameter of more than 100 $\mu$m, additionally characterised by the combination:
- of a specific surface greater than 700 m$^2$/g,
- of a pore volume of between 1 and 3.5 cm$^3$/g,
- of a roundness factor lower than 1.40,
- of a variation coefficient of the particle size distribution lower than 60%, form a particular subject of the present invention.

The present invention also relates to catalysts for the polymerisation of alpha-olefins. These catalysts, which are supported on the microspheroidal silica particles obtained according to the process of the invention, contain chromium. When it is desired to obtain catalysts capable of producing polymers exhibiting lower average molecular weights, these catalysts may additionally contain oxides of the elements of groups IVb and IIIa of the Periodic Table such as titanium, zirconium or aluminium oxides, titanium oxides being generally preferred.

The various compounds producing these oxides may be introduced as described above, during the formation of the microspheroidal silica particles. They can also be introduced in any other way which is known in the art. An example which may be mentioned is the impregnation of the silica particles with an aqueous solution of a chromium compound followed by impregnation with a nonaqueous solution of a titanium alcoholate, as described in U.S. Pat. No. 3,622,521 (Phillips Petroleum), the contents of which are incorporated by reference in the present description. The chromium compounds which are employed are preferably chosen from water-soluble salts such as chromic oxides, nitrate, acetate, chloride and sulphate or such as ammonium chromate and dichromate. Good catalysts are also obtained by reversing the order in which these two impregnations are carried out or by omitting the impregnation with titanium.

Another process for incorporating the chromium compound consists in impregnating the support, after it has been dried, with a solution in an inert hydrocarbon diluent of a chromium compound which can be converted into oxide by calcining. Examples of such compounds are t-butyl chromate and chromium acetylacetonate or acetate. The diluent is generally chosen from liquid aliphatic, cycloaliphatic and aromatic hydrocarbons such as liquid alkanes, isoalkanes and cycloalkanes and toluene.

Finally, a chromium compound can simply be physically mixed with the silica.

The solids thus obtained can be treated in all the ways which are known in the art to obtain the catalysts for the polymerisation of alpha-olefins. The dry solid containing the chromium compound is generally activated by calcining so as to convert at least a proportion of the chromium compound into hexavalent chromium oxide.

This calcination can take place, for example, by heating in the presence of molecular oxygen to a temperature of between 300° and 1200° C., preferably between 400° and 1000° C., more particularly between 350° and 950° C. The calcination is performed for a period of preferably between 30 minutes and 50 hours and more particularly between 2 and 20 hours. This operation can be carried out by keeping the catalyst in a tubular quartz reactor under a dry air stream or by keeping it in a fluidised bed until the substance has cooled. The temperature increase may be performed continuously or by conforming to one or more plateaus.

The chromium is generally present in the catalyst in proportions which vary from 0.05 to 10% by weight, preferably from 0.1 to 5%, more particularly from 0.25 to 2% by weight of chromium based on the total weight of the catalyst (support plus the chromium compound and possibly the titanium compound).

When the catalyst contains titanium, its content generally varies from 0.1 to 10% by weight, preferably from 0.5 to 7.5% by weight, more particularly from 1 to 4% by weight relative to the total weight of the catalyst.

Finally, the invention relates to a process for the polymerisation of alpha-olefins in the presence of the catalysts described above.

A considerable advantage of the process for obtaining the microspheroidal particles according to the invention is that it results in the formation of supports and consequently of catalysts of a particularly high apparent specific weight, and this makes it possible to increase the density of the polymer suspension in the reactor and consequently the production efficiency of the latter. Another advantage of this process is that it results in the formation of catalysts and polymers whose fines content is very low and which are consequently easier to process.

Another advantage of the process according to the invention is that, in some of its applications, it makes it possible to obtain supports of a particularly high specific surface, and this results in catalysts which are more active.

The chromium catalysts as described in the invention can be employed for the polymerisation of alpha-olefins containing from 2 to 8 carbon atoms per molecule and in particular for the production of ethylene homopolymers and of ethylene copolymers with one or more comonomers chosen from the alpha-olefins described above. These comonomers are preferably propylene, 1-butene, 1-pentene, 3-methyl-1-butene, 1-hexene, 3- and 4-methyl-1-pentenes and 1-octene. Diolefins containing from 4 to 8 carbon atoms can also be copolymerised with ethylene. The diolefins are preferably unconjugated aliphatic diolefins such as 1,4-hexadiene, unconjugated monocyclic diolefins such as 4-vinylcyclohexene or alicyclic diolefins containing an endocyclic bridge, such as dicyclopentadiene, methylene- and ethylidenenorbornene and conjugated aliphatic diolefins such as 1,3-butadiene, isoprene and 1,3-pentadiene.

The catalysts according to the invention are particularly suitable for the manufacture of ethylene homopolymers and of copolymers containing at least 90%, preferably at least 95% by weight of ethylene. The preferred comonomers are propylene, 1-butene, 1-hexene and 1-octene.

The polymerisation can be performed by any known process: in solution, in suspension in a hydrocarbon diluent or in gaseous phase.

The catalysts of the invention find a particularly advantageous application in suspension polymerisations for the production of polymers exhibiting a wide range of variation of melt indexes and of molecular mass distributions, these two parameters being controllable by methods which are well known in the art, such as polymerisation conditions, conditions for activating the support, its morphology and the like.

The suspension polymerisation is performed in a hydrocarbon diluent such as liquid aliphatic, cycloaliphatic and aromatic hydrocarbons, at a temperature such that the polymer formed is insoluble therein. The preferred diluents are linear alkanes such as n-butane, n-hexane and n-heptane or branched alkanes such as isobutane, isopentane, isooctane and 2,2-dimethylpropane, or cycloalkanes such as cyclopentane and cyclohexane, or their mixtures.

The polymerisation temperature is generally chosen between 20° and 200° C., preferably between 50° and 150° C., in particular between 80° and 115° C. The ethylene pressure is in most cases chosen between atmospheric pressure and 50 bars, preferably between 4 and 20 bars, more particularly between 6 and 15 bars. The polymerisation can be carried out continuously or non-continously.

DESCRIPTION OF THE PREFERRED EMBODIMENTS

Example 1, which follows, is used to illustrate the invention. Example 2R is given by way of comparison. The meaning of the symbols employed in these examples, the units expressing the quantities referred to and the methods for measuring these quantities are detailed below. The supports are observed with an optical microscope (magnification 14), the result of this observation is treated by image analysis via a Quantimet 970 analyser in order to determine the roundness factor of the particles, the mean size of the latter and the variation coefficient of the particle size distribution.

$fRo$ = roundness factor of the particle images, defined by the ratio (perimeter)$^2$/($4\pi \times$ surface area).

$D_m$ = mean diameter of the catalyst particles in $\mu$m.

$\sigma$ = variation coefficient of the particle size distribution, expressed in % ((standard deviation/Dm)$\times$100).

$\alpha$ = catalyst activity, conventionally expressed in grams of insoluble polymer obtained per hour and per gram of catalyst and divided by the molar faction of ethylene in the diluent.

$T_{ind}$ = induction period, defined as being the time elapsed between the introduction of the catalyst and the appearance of a pressure decrease characteristic of the beginning of polymerisation.

MI = melt index, measured under a 5 kg load at 190° C. and expressed in g/10 min (ASTM Standard D 1238).

HLMI = melt index, measured under a 21.6 kg load at 190° C. and expressed in g/10 min (ASTM Standard D 1238).

Ss = specific surface of the catalytic solid, expressed in m$^2$/g (British Standard BS 4359/1).

VP = pore volume of the catalyst support, measured by the nitrogen penetration method by means of porosimeters marketed by Carlo Erba Co. in the pore radius range of between 0 and 2000 Å and expressed in cm$^3$/g.

EXAMPLE 1

A—Preparation of microspheroidal silica particles

This example illustrates the preparation of microspheroidal silica particles according to the alternative form (x) of the process of the invention as illustrated in FIG. 1.

10 liters of an aqueous solution of sodium silicate containing 3.35% by weight of Na$_2$O and 10.10% by weight of SiO$_2$ are prepared in the vessel 5 intended to contain the liquid material (L); an electrode 3 is arranged therein, positively charged by means of an electrostatic charge generator 2 of the van de Graaf generator type. This liquid material (L) is sprayed at a pressure of 3 bars and at a voltage of 50 kV through a spraying orifice 4, 150 $\mu$m in diameter, into an electrically insulated chamber 1, 7 m in height and 2 m in diameter, filled with gaseous hydrogen chloride (compound (B)).

The spheroidal microparticles are collected in an aqueous solution containing 3% of ammonium sulphate (liquid (C))—7 and are then removed through the orifice 8 and filtered off. They are then washed four times in succession with water and with a solution containing 0.5% of (NH$_4$)$_2$SO$_4$. The suspension resulting from these treatments is then brought into contact with isopropanol for 4 hours and is dried for 4 hours at 150° C. and for 4 hours at 538° C.

The microspheroidal particles have a diameter of 109 $\mu$m, a $\sigma$ of 54 and an fRo of 1.27. Their Ss is 860 and their VP is 1.58.

B—Catalyst prepared from the microspheroidal particles obtained according to A 20 g of microspheroidal silica particles as prepared under heading A are introduced into a 100 ml reactor. To it are added dropwise 32 ml of a solution of chromium acetate diluted in toluene in a proportion of 6.3 g/l of chromium. The catalyst is dried by vacuum evaporation and then introduced into a tubular quartz reactor 33 mm in diameter in which dry air travels at a flow rate of 12 normal liters per hour. This device is then placed in an electric oven and heated to 815° C. for one hour. The catalyst is kept at this temperature for another 15 hours and then returned to room temperature.

C—Ethylene polymerisation 1 l of isobutane is introduced into a predried 3-l autoclave fitted with a stirrer and the temperature is then raised to 105° C. before applying a pressure of 12.9 bars of ethylene to it and introducing 50 mg of catalyst prepared according to B. The reactor is maintained under these conditions for one hour after the induction period, estimated at 17 minutes. After degassing, a polymer is recovered with an activity $\alpha$ of 42094, in the form of particles of uniform morphology, characterised by an MI of 0.2 and an HLMI of 4.4.

EXAMPLE 2R

This example is given by way of comparison.

The support employed for producing this catalyst is a silica marketed by Grace under reference number 532. Its Ss and VP are 320 and 1.65 respectively.

Its morphology is characterised as follows:
fRo = 1.43
$D_m$ = 49.5
$\sigma$ = 79

20 g of this support are impregnated with 33 ml of a solution of chromium acetate diluted in toluene in a proportion of 6.1 g/l of chromium and are then activated using a procedure which is in all respects similar to that of Example 1 heading B.

When employed for the polymerisation of ethylene using an operating method similar in all respects to that of Example 1, it produces, with an activity $\alpha$ of 31990 and an induction time of 23 minutes, a polymer of MI 1.2 and of HLMI of 22.9.

What is claimed is:

1. A process for obtaining monodisperse microspheroidal particles, comprising:
   spraying an electrostatically charged gellable liquid material (L) through a spraying orifice and into a chamber, so as to produce macrodrops which break up into microdrops which fall in the chamber and within which gelling is produced after spraying.

2. The process according to claim 1, wherein the liquid material (L) is electrostatically charged to voltages of between 1 and 100 kv by means of at least one either positively or negatively charged electrode arranged either directly in the liquid material (L) or on an outer face of the spraying orifice when the spraying orifice consists of an electrically conductive material, so as to produce macrodrops which have an overall spherical shape, which have a diameter ranging from 100 to 1000 μm, and which break up into microdrops, which microdrops have an overall spherical shape and have a diameter ranging from 50 to 200 μm.

3. The process according to claim 1, applied to the formation of monodisperse silica particles, comprising:
   (a) spraying an electrostatically charged liquid material (L) containing a gellable silicon compound through a spraying orifice and into a chamber, so as to produce macrodrops which break up into microdrops within which gelling is produced, induced by a compound (B) which is one of a liquid and a gas, and which is selected from the group consisting of acidic compounds and basic compounds;
   (b) receiving the microspheroidal particles thus obtained on a receiving means selected from the group consisting of a solid surface and a liquid medium (C); and
   (c) recovering the microspheroidal particles.

4. The process according to claim 3, further comprising:
   (d) washing the microspheroidal particles with water and then with a washing agent selected from the group consisting of an aqueous solution of at least one ammonium salt and an aqueous solution of at least one dilute acid;
   (e) treating the washed microspheroidal particles thus obtained with an organic liquid selected from the group consisting of alkanols containing from 1 to 4 carbon atoms and alkanones containing from 3 to 5 carbon atoms; and
   (f) drying the treated microspheroidal particles.

5. The process according to claim 3, wherein the gellable silicon compound present in the liquid material (L) is selected from the group consisting of alkali metal silicates, ammonium silicates, quaternary ammonium silicates, and tetra-alkoxysilanes.

6. The process according to claim 3, wherein compound (B) is selected from the group consisting of acidic compounds including inorganic oxyacids, inorganic hydracids, and carboxylic acids, and basic compounds including ammonia, aliphatic amines, alicyclic amines, and aromatic amines.

7. The process according to claim 3, wherein the receiving means is a liquid medium (C) and is selected from the group consisting of water, an ammonium sulphate solution, aqueous ammonia, and an aqueous solution of hydrochloric acid.

8. The process according to claim 3, wherein the liquid material (L) is vaporised in the chamber, which chamber contains compound (B) in the gaseous state.

9. The process according to claim 3, wherein the liquid material (L) and the compound (B) both have a form which is one of a liquid and an aqueous solution, and are sprayed into the chamber independently of each other but simultaneously.

10. The process according to claim 3, wherein the liquid material (L) is brought into contact with an aqueous solution of the compound (B) in a mixer die situated in front of the spraying orifice.

11. The process according to claim 3, wherein the liquid material (L) additionally contains a chromium compound capable of coprecipitating with the gellable silicon compound.

12. The process according to claim 3, wherein the liquid material (L) additionally contains a titanium compound capable of coprecipitating with the gellable silicon compound.

13. The process according to claim 2, wherein the chamber contains $TiCl_4$ vapour which is capable of being incorporated into the gelling microdrops by adsorption.

14. Microspheroidal silica particles made by spraying an electrostatically charged gellable liquid material and having a diameter ranging from 50 to 200 μm, a specific surface greater than 700 m²/g, a pore volume of between 1 and 3.5 cm³/g, a roundness factor lower than 1.40, and a variation coefficient of the particle size distribution lower than 60%.

15. A catalyst for the polymerisation of alpha-olefins, containing chromium and being supported on monodisperse microspheroidal particles obtained by the process of claim 1.

16. A catalyst for the polymerisation of alpha-olefins, containing chromium and being supported on the monodisperse microspheroidal silica particles according to claim 14.

17. The catalyst according to claim 15, additionally containing titanium.

* * * * *